US010581883B1

(12) United States Patent
Syme et al.

(10) Patent No.: US 10,581,883 B1
(45) Date of Patent: Mar. 3, 2020

(54) IN-TRANSIT VISUAL CONTENT ANALYSIS FOR SELECTIVE MESSAGE TRANSFER

(71) Applicant: Area 1 Security, Inc., Redwood City, CA (US)

(72) Inventors: Philip Syme, Ellicott City, MD (US); Michael Flester, Highland, MD (US); Umalatha Batchu, Cupertino, CA (US); Rajiv Jain, Vienna, VA (US)

(73) Assignee: AREA 1 SECURITY, INC., Redwood City, CA (US)

( * ) Notice: Subject to any disclaimer, the term of this patent is extended or adjusted under 35 U.S.C. 154(b) by 191 days.

(21) Appl. No.: 15/968,733

(22) Filed: May 1, 2018

(51) Int. Cl.
*H04L 29/06* (2006.01)
*H04L 12/58* (2006.01)

(52) U.S. Cl.
CPC .......... *H04L 63/1416* (2013.01); *H04L 51/12* (2013.01); *H04L 63/1425* (2013.01)

(58) Field of Classification Search
CPC ..... H04L 63/1416; H04L 51/12; H04L 51/26; H04L 51/28; H04L 63/126; H04L 63/14; H04L 63/1425; H04L 63/1483; H04L 61/1511; H04L 61/301; G06F 16/951; G06F 2221/2119
See application file for complete search history.

(56) References Cited

U.S. PATENT DOCUMENTS 8,291,021 B2 * 10/2012 Rowley ................ G06Q 10/107
709/206
2014/0082726 A1 3/2014 Dreller et al.
(Continued)

OTHER PUBLICATIONS

Jain et al., 'Phishing Detection: Analysis of Visual Similarity Based Approaches,' Security and Communication Networks, vol. 2017 (2017), https://doi.org/10.1155/2017/5421046; Jan. 10, 2017; 20 pages.

(Continued)

*Primary Examiner* — Amir Mehrmanesh
(74) *Attorney, Agent, or Firm* — Hickman Palermo Becker Bingham LLP; Christine E. Orich

(57) ABSTRACT

In an embodiment, a computer system comprises one or more computer processors configured with a message transfer application; a message transfer/vision processing (MT/VP) interface coupled to the one or more computer processors and interposed between the message transfer application and a vision processing computer, wherein the MT/VP interface performs operations comprising: extracting risk indicator data from a message that is in transit to a recipient computer on a computer network; in response to the risk indicator data matching a message risk criterion, transmitting an image address for an image of interest coupled to the message or the image of interest to the vision processing computer; receiving, from the vision processing computer, a label that semantically describes visual content of the image of interest; using the label, querying a set of correlation data to determine a reference address that is associated with the label; in response to the image address matching the reference address, transmitting the message to the recipient computer; in response to the image address not matching the reference address, modifying, delaying or blocking the transmitting of the message to the recipient computer.

18 Claims, 6 Drawing Sheets

(56) References Cited

U.S. PATENT DOCUMENTS

| | | | |
|---|---|---|---|
| 2016/0098426 A1* | 4/2016 | Sayko | G06F 16/5838 |
| | | | 707/770 |
| 2017/0195363 A1* | 7/2017 | Dahan | H04L 63/0281 |
| 2017/0244736 A1* | 8/2017 | Benishti | H04L 63/1441 |
| 2018/0027013 A1 | 1/2018 | Wright et al. | |
| 2019/0215335 A1* | 7/2019 | Benishti | H04L 63/1441 |

OTHER PUBLICATIONS

David G. Lowe, 'Distinct Image Features from Scale-Invariant Keypoints,' Computer Science Dept Univ of British Columbia, Interntl Journal of Computer Vision, dated Jan. 5, 2004; 28 pages.

Bay, H., Ess, A., Tuytelaars, T., Van Gool, L.: 'SURF: Speeded up robust features,' Computer Vision and Image Understanding 110, 346-359 dated 2008, 14pgs.

Alcantarilla et al., 'Kaze features,' eccv2012; Part VI, LNCS 7577, pp. 214-227, c Springer-Verlag Berlin Heidelberg dated 2012, 14pgs.

\* cited by examiner

IN-TRANSIT VISUAL CONTENT ANALYSIS FOR SELECTIVE MESSAGE TRANSFER

TECHNICAL FIELD

One technical field of the present disclosure is computer security in the field of preventing admission of electronic messages that contain malicious links or other content. Another technical field of the present disclosure is visual content analysis techniques as applied to electronic communications over a computer network.

BACKGROUND

Computer networks facilitate the communication of electronic messages from sender computers to recipient computers. Electronic messages include communications, such as email, text messages, digital voice messages, and instant messages. Electronic messages can include electronic files and/or links to electronic files. A link is a text-based reference to a location of a computer resource on a network and may include a uniform resource locator (URL), a domain address such as a Simple Mail Transfer Protocol (SMTP) address or a Hypertext Transfer Protocol (HTTP) address, or an Internet Protocol (IP) address, for example. Electronic files may include text, graphics, digital images, digital audio, sensor data, or any combination of different types of digital content.

Messaging systems implemented on a network control the flow of electronic messages from sender computers to recipient computers. Messaging systems can include server computers, such as mail servers, configured with software applications such as message routers, load balancers, and message transfer agents (MTAs). Messaging systems are often configured with security software that is designed to protect recipient computers and the network from security risks and other issues that may be associated with particular electronic messages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF THE INVENTION

The appended claims may serve as a summary of the invention.

DETAILED DESCRIPTION

Figure 1:
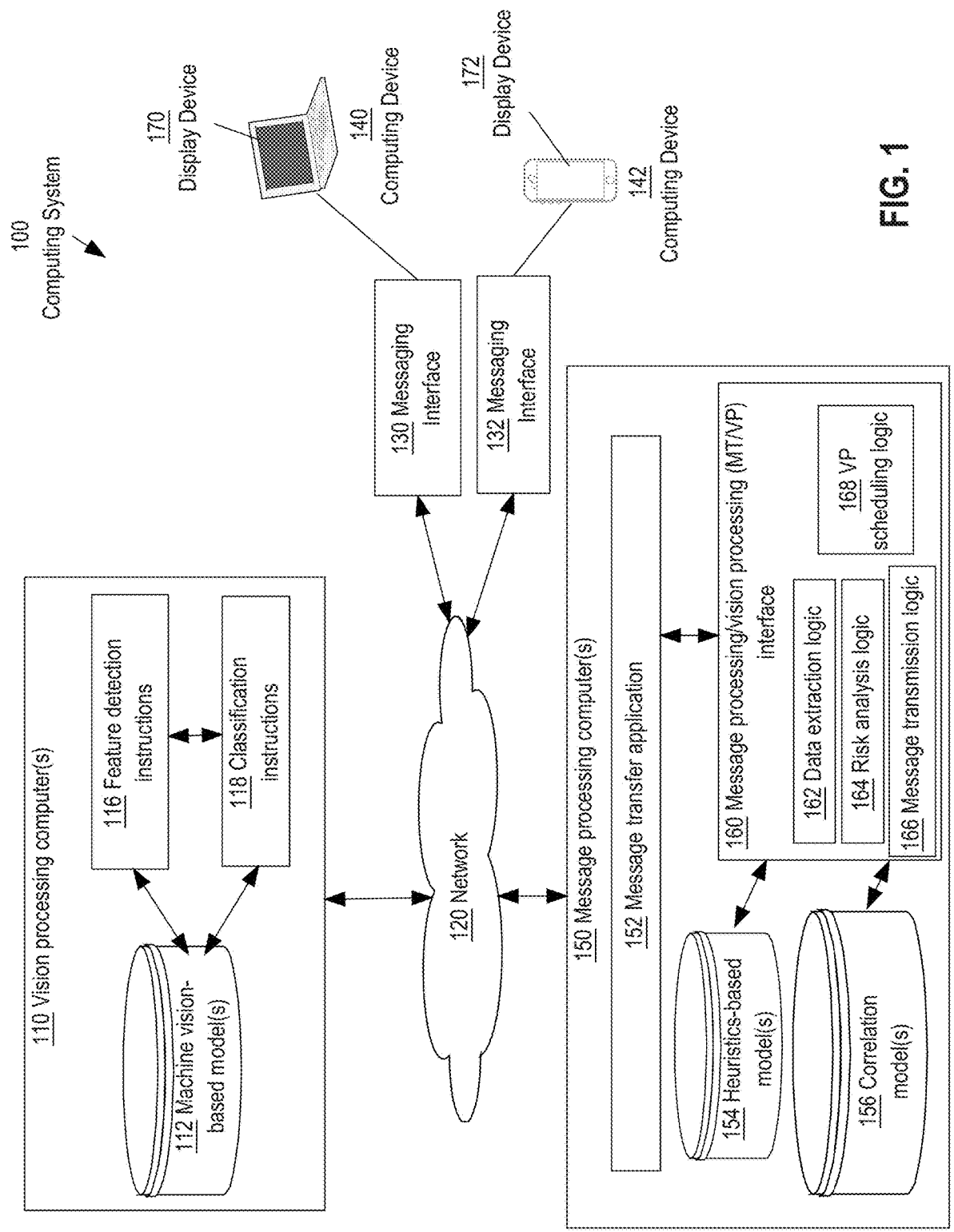
FIG. 1 is a block diagram that depicts an example computing system, which includes message processing computer(s), vision processing computer(s), and a message processing/vision processing interface, in an embodiment.

This detailed description refers to the different drawings by specifying the numbers of the figures, and to the different parts by the use of reference numerals. While specific embodiments are described, the subject matter regarded as an invention is particularly pointed out by the appended claims and need not be limited by the details of the described embodiments.

General Overview

Phishing is one example of a security risk that is important for messaging systems to protect against. Phishing messages often trick the recipient into providing personal or business confidential information by appearing to be from a legitimate source. Many existing phishing detection techniques focus on detecting fake domain names that are likely to be involved in a phishing campaign. However, text-based approaches do not work if the phishing attempt uses images rather than text.

Visual similarity-based anti-phishing techniques have been explored. However, known visual similarity-based approaches suffer from many problems, including the inability to detect zero-day attacks, the lack of robustness of the image matching techniques employed, and the complexity and resulting high computational burden of image processing algorithms.

The lack of protection against zero-day attacks means that existing systems can only detect the types of attacks that the system has seen previously and cannot protect against new phishing attacks that the systems do not recognize. The lack of robustness of image matching techniques causes existing systems to be unable to detect images that do not closely match those that have been used to train the image processing system. For example, copies of an image that are rotated, off-color, blurred, differently-scaled, or higher or lower resolution may not be detected by existing systems if similar images are not present in the training data set or if the image processing algorithm(s) do not account for these types of variations. The high computational burden of image processing algorithms causes existing techniques to be very time consuming and difficult to use in an online environment.

An additional challenge for anti-phishing techniques and other message risk detection approaches is in determining the appropriate thresholds at which the system should take action to affect the communication of a particular message. A threshold that is set too low results in a high false positive rate and causes too many messages to be blocked, quarantined, or marked as suspicious before delivery to a recipient computer. A threshold that is set too high results in a high false negative rate and allows suspicious messages to avoid detection, propagating security risks to downstream computers.

The inventors have recognized that successful implementation in messaging systems of anti-phishing techniques and other measures for proactively detecting suspicious messages has been complicated by particular operational requirements of messaging systems. These operational requirements include round-the-clock, 24 hours, 7 days a week availability and reliable message delivery without unnecessary delays or memory leaks.

In this disclosure, technologies are described for addressing the ongoing challenges of accurately and reliably detecting suspicious messages, including but not limited to phishing messages, and preemptively handling those messages while maintaining the operational requirements of a messaging system. While this disclosure describes the invention in the context of an anti-phishing use case, aspects of the disclosed technologies are equally useful in other applications, such as detecting sales of counterfeit products, uncovering 'fake' information campaigns, spotting brand abuse, or detecting unauthorized copies of digital images.

As described in detail below, aspects of the disclosed technologies can address the shortcomings of the above-described existing approaches and improve the functioning of a computer-implemented messaging system through the use of a programmable interface that is configured to selectively apply automated visual content analysis to electronic messages that are in-transit on a computer network. In an embodiment, interactions between the messaging system and the automated visual content analysis are controlled through the programmable interface.

Technologies for interfacing a messaging system with a vision processing system on a computer network are disclosed. In an embodiment, a message transfer/vision processing interface selectively engages the vision processing system to analyze electronic messages that are in-transit from a sender computer to a recipient computer. The message transfer/vision processing interface causes labels and/or other data provided by the vision processing system to be made accessible to the messaging system. The messaging system may use the labels and/or other data received through the message transfer/vision processing interface to alter its handling of an in-transit message.

In an embodiment, a computer system comprises one or more computer processors configured with a message transfer application; a message transfer/vision processing (MT/VP) interface coupled to the one or more computer processors and interposed between the message transfer application and a vision processing computer, wherein the MT/VP interface performs operations comprising: extracting risk indicator data from a message that is in transit to a recipient computer on a computer network; in response to the risk indicator data matching a message risk criterion, transmitting an image address for an image of interest coupled to the message or the image of interest to the vision processing computer; receiving, from the vision processing computer, a label that semantically describes visual content of the image of interest; using the label, querying a set of correlation data to determine a reference address that is associated with the label; in response to the image address matching the reference address, transmitting the message to the recipient computer; in response to the image address not matching the reference address, modifying, delaying or blocking the transmitting of the message to the recipient computer. Other embodiments, features and aspects will become apparent from the disclosure as a whole.

Throughout this disclosure, an element that is identified by a noun followed by the letter s in parentheses, as in (s), indicates that one or more of the element may be used in various embodiments.

Computing System Overview

FIG. 1 is a block diagram that depicts an example computing system 100 arranged to operate messaging interfaces 130, 132, message processing computer(s) 150, and vision processing computer(s) 110, in the transmission of electronic messages from sender computers to recipient computers, such as computing devices 140, 142, over an electronic communications network 120, in an embodiment. Vision processing computer(s) 110, computing devices 140, 142, and message processing computer(s) 150 are communicatively coupled to the electronic communications network 120. Display devices 170, 172 are communicatively coupled to computing devices 140, 142, respectively.

Implemented in the computing devices 110, 140, 142, 150 using computer software, hardware, or software and hardware, are processor-executable instructions, data structures, and digital data, stored in memory, which cooperate to provide the computer-implemented functionality described herein. For ease of discussion, these computer-implemented components are represented schematically in FIG. 1 as machine vision-based model(s) 112, feature detection instruction(s) 116, classification instruction(s) 118, messaging interfaces 130, 132, message transfer application 152, message processing/vision processing (MT/VP) interface 160 (which includes data extraction logic 162, risk analysis logic 164, message transmission logic 166, and vision processing (VP) scheduling logic 168), heuristics-based model(s) 154, correlation model(s) 156, which are described in detail below.

"System" as used herein may refer to a single computer or network of computers and/or other devices. "Computer" or "computing device" as used herein may refer to a computer or any other electronic device that is equipped with a processor. Although computing system 100 may be implemented with any number of the described components, in this disclosure, these elements may be referred to in the singular form for ease of discussion. "Logic" as used herein may refer to one or more sets of computer program instructions; in all cases, elements of logic are capable of computer execution or evaluation to generate output based upon a computer transformation of an input dataset into different digitally stored, electronic data. "Model" as used herein may refer to one or more sets of computer program instructions and datasets that collectively define representations of rules or transformations of other data representing images, graphical elements or text; in all cases, a model is capable of computer execution or evaluation to generate output specifying a class, type or other characterization of an input dataset. Also, while the described computer components are shown as separate elements in the drawings, the illustrations are not meant to imply that separation of these elements is required. The illustrated components may be divided over any number of physical systems or may be contained in a single physical computer system and can communicate with each other in any appropriate manner.

In some embodiments, each of computing devices 140, 142 is a client-side computing device or set of cooperating computing devices, such as a smart phone, tablet computer, wearable or body-mounted device, smart appliance, laptop machine, or combination of any of such devices, and computer(s) 110, 150 are each a server-side computing device such as a server computer or a cluster or network of server computers accessible by the Internet, for example in a public or private cloud. As illustrated in FIG. 1, each of display devices 170, 172 is implemented as part of a computing device 140, 142, respectively, but may be implemented as a separate device or as part of another device, or as multiple networked display devices, in other implementations.

Messaging interfaces 130, 132 are each client-side messaging software such as a mail client or a messaging application, which reside in memory of computing devices 140, 142, respectively. Phishing attacks and other security risks can occur during the transmission of messages or during the download of electronic content from the Internet. Thus, in some embodiments, a message may refer to an electronic file that is downloaded from network 120 to computing devices 140, 142 via messaging interfaces 130, 132. As such, messaging interfaces 130, 132 may be implemented as any type of client-side software applications that are configured to display visual content, such as web browsers, search engines, web-based applications, social media applications. Portions of messaging interfaces 130, 132 may be hosted by a hosting computer (not shown) on the network 120.

Figure 5:
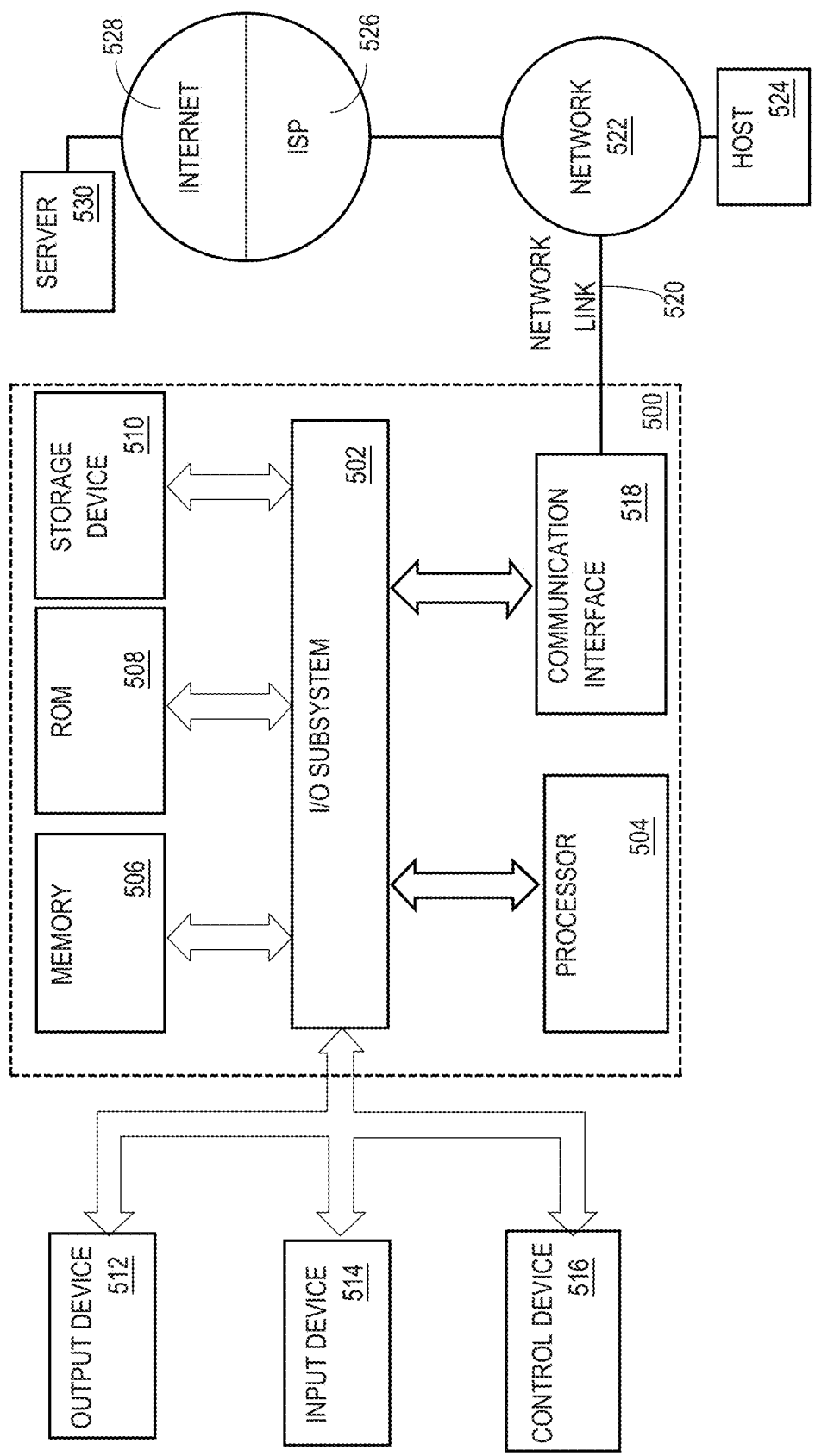
FIG. 5 is a block diagram that illustrates a computer system upon which an embodiment of the present invention may be implemented.

Messaging interfaces 130, 132 cooperate with display devices 170, 172, respectively, to provide graphical user interfaces through which electronic messages can be received, displayed, read, managed, composed, and sent, via human interaction with input and output device(s) of computing devices 140, 142. Examples of input and output device(s) and other components of computing devices 110, 140, 142, 150 are shown in FIG. 5, described below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142, 150.

Example Vision Processing Techniques

Vision processing computer(s) 110 are configured with image processing technologies that can include machine vision-based technologies for recognizing visual content contained in digital images. When called by MT/VP interface 160, vision processing computer(s) 110 perform visual content analysis on a digital image that is associated with an electronic message that is being handled by message transfer application 152. Vision processing computer(s) 110 output, for use by MT/VP interface 160, a label that describes visual content of the digital image.

In an embodiment, recognizing visual content includes recognizing semantic content, which refers to a process of extracting meaning from the visual content of the digital image. An example of extracting meaning is determining, based on a computational analysis of measurements extracted from image pixel data, that the image contains a depiction of a particular design, such as a corporate logo, a pattern, a graphic, or trade dress, or another particular type of visual content, such as a depiction of a particular object, a scene, a person, or an activity. That is, rather than simply determining that an image contains a set of blue, red, and yellow pixels, for example, recognizing semantic content determines a semantic concept that is represented by a particular arrangement of pixels in an image. The semantic concept may be described in a text-based label using, for example, a noun or noun-based phrase, such as "blue apple," "man sitting," or "ABC Bank logo."

To automate the process of determining semantic content of digital images, vision processing computer(s) 110 are configured with classical machine learning-based and/or neural network-based machine vision technologies. An implementation of vision processing computer(s) 110 may use a cloud-based commercial or open source vision processing service accessible by an application programming interface (API), such as GOOGLE VISION API or MICROSOFT AZURE COMPUTER VISION API. Vision processing computer(s) 110 may, alternatively or in addition, be specially programmed with domain-specific vision processing software in accordance with the requirements of a particular design of computing system 100; for example, machine vision-based logo detection software.

In an embodiment, the machine vision-based technologies of vision processing computer(s) 110 include feature detection instruction(s) 116, classification instruction(s) 118, and machine vision-based model(s) 112, which are implemented using computer programming code and data stored in electronic files and/or databases in memory of vision processing computer(s) 110.

Feature Detection

Feature detection instruction(s) 116 when executed by a processor extract numerical measurements, such as measurements of pixel intensity, size, location, direction, gradient, and/or color, from various pixel locations within an image of interest, and store these measurements in a data structure, such as a vector. The measurements that are extracted from an image may be referred to as features of the image. Pixel locations of interest within an image may be defined using x and y coordinates of a Cartesian coordinate system and may be referred to as keypoints. A set of measurement data may be referred to as a feature vector. Each dimension of the feature vector contains a numerical value that represents a measurement of some characteristic (such as pixel intensity) of some portion (such as a particular pixel or a particular set of pixels) of the image from which the measurement was extracted.

Examples of feature detection algorithms that may be used in embodiments of the invention include scale-invariant or multiscale feature detection algorithms, which can detect and describe image features at different scale levels or resolutions, thereby improving the likelihood of accurately detecting a matching image despite differences in scale or resolution. One example of feature detection and description algorithms that can be used in embodiments of the invention is KAZE (a multiscale two-dimensional feature detection and description algorithm in nonlinear scale spaces, described in *KAZE Features*, published by Springer-Verlag Berlin Heidelberg, 2012).

Machine Vision-Based Model(s)

A machine vision-based model 112 contains association data that indicates relationships between the features extracted from the images in the training data set and various semantic labels. The labels may be pre-defined, such as through a manual process. For instance, a semantic label may include the name of a particular logo or the name of a company that is the owner of a particular logo or the name of a product or service that is associated with a particular design or graphical artwork.

In general, a model as that term is used herein may refer to a combination of data and/or algorithmic logic that is implemented on a computer. A model may include raw data and computed data values that are stored in a data structure, such as a searchable database, an ontology, or a tree, such as a randomized k-d tree. A model may further include programming code stored in electronic files, which can be executed by a processor to cause the computer to implement various rules and/or algorithms for determining relationships between data.

A reference set of images, typically many other images, which may be referred to as training data, is used to train the machine vision-based model(s) 112. A reference set of images can be obtained from a publicly available data source, such as IMAGENET.

When trained, the machine vision-based model(s) 112 store data that indicates probabilistic or statistical relationships between sets of features extracted from the training data and particular semantic labels. For example, a machine vision-based model 112 that is trained to recognize a particular corporate logo mathematically associates probabilistic or statistical data values with various sets of features according to how likely it is, mathematically, that the sets of features represent a depiction of the particular logo.

A model 112 can be trained for a particular purpose, such as to recognize a particular type of visual content, or for a general purpose, such as to recognize any human face, by selecting training data that is representative of the type of visual content desired to be recognized by the machine vision-based process. A model 112 can also be trained to recognize multiple different particular types of visual content. For instance, a model 112 may be trained to detect any of a number of different corporate logos or designs that are often used or likely to be used in phishing attacks.

Classification

Classification instruction(s) 118 when executed by a processor mathematically measure the similarity of measurement data extracted from an image of interest by feature detection instruction(s) 116 to a reference set of measurement data, using machine vision-based model(s) 112. To measure similarity, a mathematical algorithm computes a distance, for example a geometric distance, between the measurement data extracted from the image of interest and the reference set of measurement data. An example of a classification algorithm that can be used in an embodiment of the invention is the nearest neighbor algorithm. The output of classification instruction(s) 118 can include a label that is associated with the image of interest.

Figure 4A:
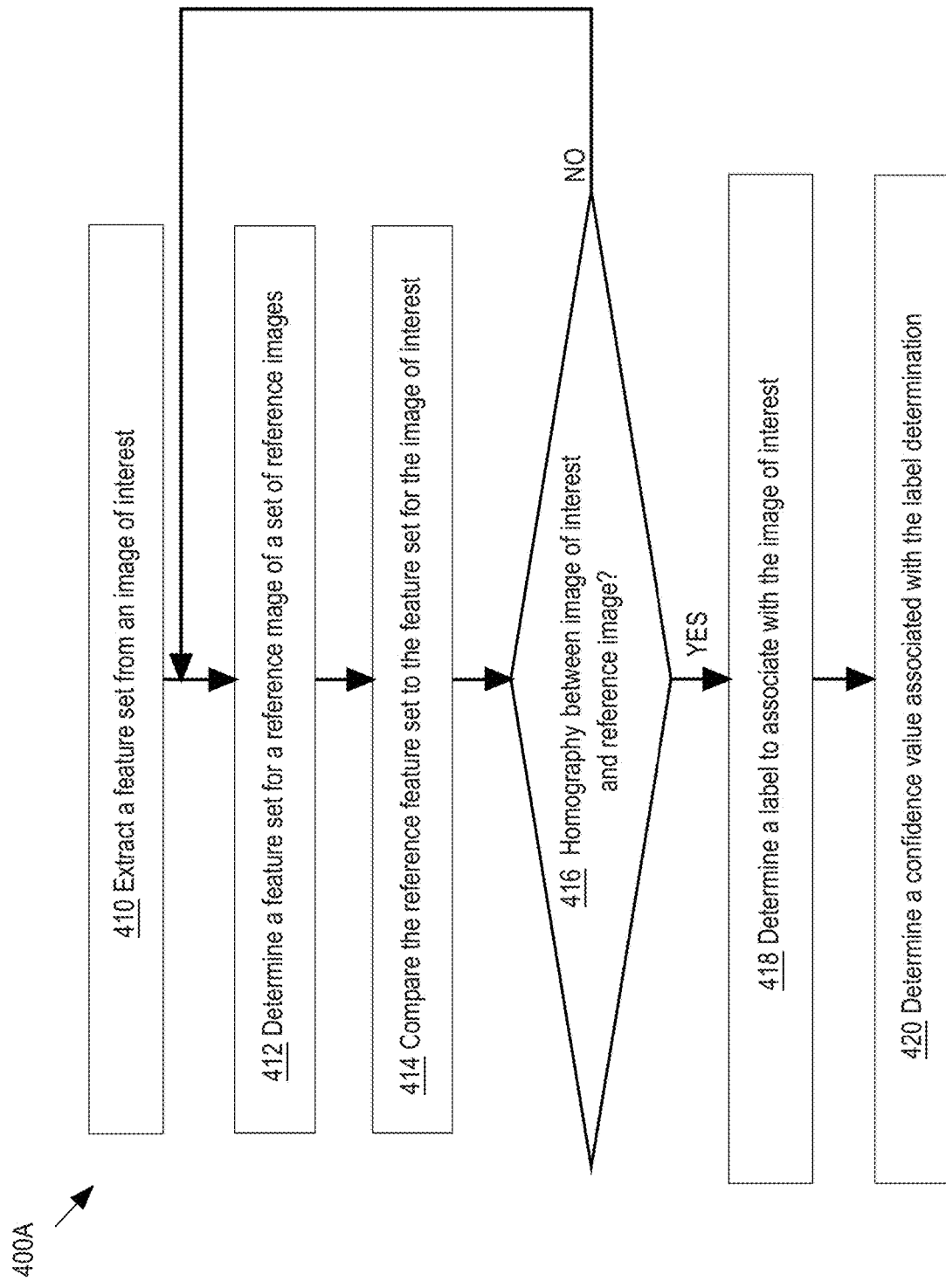
FIG. 4A is a flow diagram that depicts a process that may be executed by a vision processing computer to determine visual content of an image, in an embodiment.
Figure 4B:
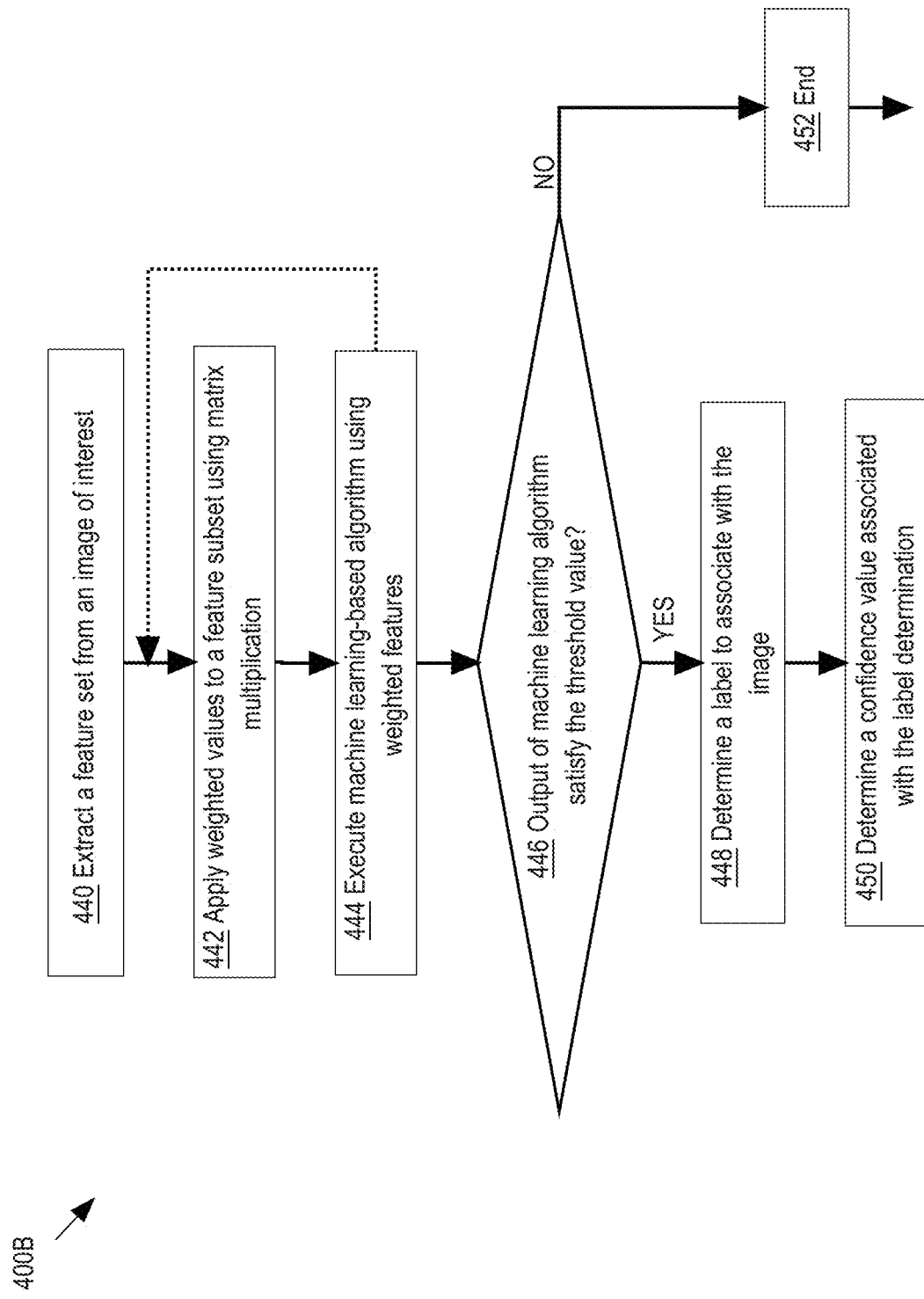
FIG. 4B is a flow diagram that depicts another process that may be executed by a vision processing computer to determine visual content of an image, in an embodiment.

The above-described implementation of vision processing computer(s) 110 uses a classical machine learning-based approach to visual content analysis image processing. A more specific example of a classical machine learning-based approach that can be implemented by vision processing computer(s) 110 is shown in FIG. 4A, described below. In other embodiments, vision processing computer(s) 110 use a neural network-based approach in which the feature detection processes and classification processes are both performed by a neural network. An example of a neural network-based approach that can be implemented by vision processing computer(s) 110 is shown in FIG. 4B, described below.

Message Processing

Message transfer application 152 when executed by a processor controls the transmission of electronic communications between sender computers and recipient computers, such as computing devices 140, 142, on the network 120. Portions of message transfer application 152 may be implemented as or in combination with a text messaging service such as SMS (Short Message Service) or MMS (Multimedia Messaging Service), or as a Voice over Internet (VOIP) server or as a mail server of a public or private electronic mail or messaging system. Message transfer application 152 may include various message scanning and filtering technologies, such as virus scanners, intrusion detection systems, and/or spam filters.

MT/VP Interface

Message processing/vision processing (MT/VP) interface 160 when executed by a processor controls the selective engagement of vision processing computer(s) 110 by message processing computer(s) 150 in tasks performed by, or requested by, message transfer application 152. MT/VP interface 160 manages and facilitates electronic communications of data and instructions between message processing computer(s) 150 and vision processing computer(s) 110 during the handling by message transfer application 152 of electronic messages, for example messages that are being transmitted from computing device 140 to computing device 142 over network 120. MT/VP interface 160 is shown as a separate component in FIG. 1 but all or portions of MT/VP interface 160 may be implemented as part of message transfer application 152. Alternatively, or in addition, some portions of MT/VP interface 160 may be implemented on vision processing computer(s) 110.

MT/VP interface 160 includes data extraction logic 162, risk analysis logic 164, message transmission logic 166, and vision processing (VP) scheduling logic 168. In executing one or more of data extraction logic 162, risk analysis logic 164, message transmission logic 166, VP scheduling logic 168, MT/VP interface 160 accesses and utilizes data and logic stored in heuristics-based model(s) 154 and correlation model(s) 156 as described below.

Data Extraction

Data extraction logic 162 when executed by a processor extracts risk indicator data from an electronic message that is in-transit to a recipient computer on network 120. The risk indicator data may include text-based features extracted from the header or from the body of a message, such as links, addresses, and keywords or phrases. The extracted risk indicator data can be used by risk analysis logic 164, described below, to determine whether to engage vision processing computer(s) 110 in determining a level of risk associated with an electronic message.

Risk indicator data can include raw data or computed data that is derived from extracted raw data. For instance, risk indicator data may include quantitative data and/or qualitative data. An example of quantitative data is a count of the number of images that are attached to an electronic message or a count of the number of links contained within an electronic message that link to image files.

An example of qualitative data is text-based data that indicates whether the electronic message falls within a particular category. For instance, a domain name or address associated with the sender of the message and/or the domain name or address of the intended recipient of the message can be extracted from the message header and used to determine whether the transmission of the message is likely to cross an organizational boundary, such a boundary between an internal network of an organization and an external network, such as the Internet.

In an embodiment, data extraction logic 162 when executed by a processor extracts digital image(s) and/or image-related data (such as file names) from the electronic message. Thus, risk indicator data may include image(s) and/or image-based information extracted from the message.

Risk Analysis

Risk analysis logic 164 when executed by a processor reads the risk indicator data extracted from a message by data extraction logic 162 and compares the risk indicator data to an applicable message risk criterion and determines a level of risk associated with the message based on this comparison. Risk analysis logic 164 determines the level of risk associated with a message either with or without invoking vision processing computer(s) 114.

At a first stage, risk analysis logic 164 determines whether a message contains a type of risk that should cause MT/VP interface 160 to invoke vision processing computer(s) 114 to perform visual content analysis on an image that is contained in or associated with a message. At a second stage, risk analysis logic 164 determines an overall level of risk associated with the message, based on analysis of text-based portions of the message, image portions of the message, or a combination of text and image portions of the message. Ultimately, risk analysis logic 164 outputs risk level data that is used by message transmission logic 166 to determine whether to modify, delay, or block the transmission of the message to the recipient computer.

To determine whether to engage vision processing computer(s) 114, in the first stage, risk analysis logic 164 may compare quantitative risk indicator data extracted from the message by data extraction logic 162 to a threshold data value that is retrieved by risk analysis logic 164 from computer memory. For example, if the count of image links contained in a message or the size of a particular image contained in or attached to a message exceeds a threshold value, risk analysis logic 164 may proceed to invoke vision processing computer(s) 110 to examine the visual content of a particular image associated with the message. On the other hand, if the count of image links contained in a message or the size of a particular image contained in or attached to a message does not exceed a threshold value, risk analysis logic 164 may skip the visual content analysis of any images associated with the message and allow the message to be transmitted to the recipient computer without performing any vision processing on the associated images.

Alternatively, or in addition, in order to determine whether to engage vision processing computer(s) 114, risk analysis logic 164 may compare qualitative risk indicator data extracted from the message to category data retrieved from memory by risk analysis logic 164. If the qualitative data matches a pre-defined category that is associated with a particular type of message or a particular level of risk, risk analysis logic 164 may proceed to invoke vision processing computer(s) 110 to perform visual content analysis on a particular image that is associated with the message, in order to further assess the risk of harm to the network 120 or the recipient computer if the message is transmitted to the recipient computer.

For instance, if risk analysis logic 164 determines that a message's header indicates that either the sender computer's address or recipient computer's address corresponds to an "external" category of computer addresses, risk analysis logic 164 may invoke vision processing computer(s) 110 to perform visual content analysis on an image that is associated with the message. On the other hand, if the header information indicates that both the sender computer's address and the recipient computer's address correspond to an "internal" category of computer addresses, risk analysis logic 164 may skip the visual content analysis of any images associated with the message and allow the message to be transmitted to the recipient computer without performing any vision processing on the associated images.

The threshold value(s) used by risk analysis logic 164 are variable and can be adjusted based on experimentation or based on the requirements of a particular implementation of the system. If vision processing computer(s) 110 are engaged, then the output of the vision processing computer(s) 110 may include a label that enables risk analysis logic 164 to better assess the risk of harm to the network 120 or to the recipient computer that may be posed if the transmission of the message to the recipient computer is allowed to proceed, as described below.

Heuristics-based model(s) 154 stores heuristic rules and related parameters, such as threshold data values and/or other criteria for determining whether a particular rule applies to a particular electronic message or portion of an electronic message. These rules and associated data may be domain-specific or general in nature and may be manually authored using a computer programming language such as, for example, Python. Heuristics-based model(s) 154 are implemented using, for example, a data file or a database.

In an embodiment, heuristics-based model(s) 154 are used by risk analysis logic 164 of MT/VP interface 160 to determine to invoke, or determine not to invoke, the machine vision-based technologies provided by vision processing computer(s) 110 to perform visual content analysis on an image of interest that is associated with a particular electronic message. In another embodiment, heuristics-based model(s) 154 are used by MT/VP interface 160 to supplement information provided by a machine vision-based analysis of an image of interest. In this way, risk analysis logic 164 can use a combination of heuristic rule-based analysis of text-based data associated with a message, such as header data and metadata, and machine vision-based analysis of an image contained in, attached to, or linked to by the message, to determine a risk level associated with transmission of a message to a recipient computer.

As an example, a heuristics-based model 154 may include rules and associated parameters that indicate relationships between particular text phrases that may be present in certain types of electronic messages and particular risk levels or particular forms of message processing. Risk analysis logic 164 can then flag a message for appropriate processing upon detecting the presence of a particular text phrase in a message.

If, after evaluating quantitative and/or qualitative risk indicator data output by data extraction logic 162, risk analysis logic 164 concludes that the risk indicator data extracted from the message does not satisfy the applicable message risk criterion, then MT/VP interface 160 may communicate a parameter or an instruction to message transmission logic 166 or message transfer application 152 to continue transmitting the message to the recipient computer without invoking the vision processing computer(s) 110.

If, however, risk analysis logic 164 concludes that the risk indicator data extracted from a message by data extraction logic 162 satisfies a message risk criterion, risk analysis logic 164 communicates with vision processing scheduling logic 168 to cause vision processing computer(s) 110 to perform visual content analysis on an image associated with the message. Vision processing computer(s) 110 use the techniques described above to determine and output a label associated with the image for which visual content analysis was requested by risk analysis logic 164.

Risk analysis logic 164 uses the label output by vision processing computer(s) 110 to determine the second stage risk level data for the message. Risk analysis logic 164 accesses correlation model(s) 156 to determine whether an address associated with the image, such as a sender address extracted from the message by data extraction logic 162, matches an address that is associated with the label in correlation model(s) 156. In an embodiment, correlation model(s) 156 are implemented as a mapping of semantic labels with computer addresses.

If risk analysis logic 164 determines that the address extracted from the message does not match the address associated by correlation model(s) 156 with the label output by vision processing computer(s) 110, risk analysis logic 164 may output risk level data to cause message transmission logic to modify, delay or block transmission of the message to the recipient computer. If risk analysis logic 164 determines that the address extracted from the message matches the address associated by correlation model(s) 156 with the label output by vision processing computer(s) 110, risk analysis logic 164 may output risk level data to cause message transmission logic to continue transmitting the message to the recipient computer without delay or modification.

Message Transmission

Message transmission logic 166 when executed by a processor determines, based on the risk level data output by risk analysis logic 164, whether to modify, delay, block, or continue transmitting a message handled by message transfer application 152 to a recipient computer. To do this, message transmission logic 166 can map the risk level data output by risk analysis logic 164 to an appropriate network instruction using, for example, a mapping table, and then communicate the network instruction that corresponds to the risk level data to message transfer application 152. The network instruction output by message transmission logic 166 can include a network command to modify, delay, block, or continue transmitting a message. An instruction to modify a message transmission may include an instruction to re-direct or quarantine a message.

Vision Processing Scheduling Logic

Vision processing scheduling logic 168 when executed by a processor manages the engagement of vision processing computer(s) 110 by MT/VP interface 160 in accordance with the operational requirements of message processing computer(s) 150 and/or the network 120, after risk analysis logic 164 has determined to invoke vision processing computer(s) 110. MT/VP interface 160 including vision processing scheduling logic 168 enables the image processing performed by vision processing computer(s) 110 to be executed selectively and in parallel or concurrently with the main message processing routines that are performed on in-transit messages by message transfer application 152.

In an embodiment, VP scheduling logic 168 starts a timer when risk analysis logic 164 makes a call to vision processing computer(s) 110. If, before the timer expires, vision processing computer(s) 110 do not return a label, or return error data instead of a label, or return low confidence data in connection with a label, then in response to the call, VP scheduling logic 168 communicates with risk analysis logic 164 or directly with message transmission logic 166 to cause the message to which vision processing was being applied to be processed according to its risk level prior to and without the vision processing output. In other words, VP scheduling logic 168 can cause termination of the vision processing being performed by vision processing computer(s) 110 for a particular message if an error occurs or if an aspect of the vision processing does not comply with the operational requirements of the system.

VP scheduling logic 168 can also control the deployment of particular ones of the machine vision-based model(s) 112, deploy new model(s) 112, and/or automatically restart vision processing computer(s) 110 hosting the model(s) 112. VP scheduling logic 168 can, for example, cause vision processing computer(s) 110 to continue training a model 112 silently offline and then once the reliability of the model 112 has satisfied a confidence criterion, cause vision processing computer(s) 110 to bring the model online for live operation in connection with MT/VP interface 160.

Example System Architecture

Figure 2:
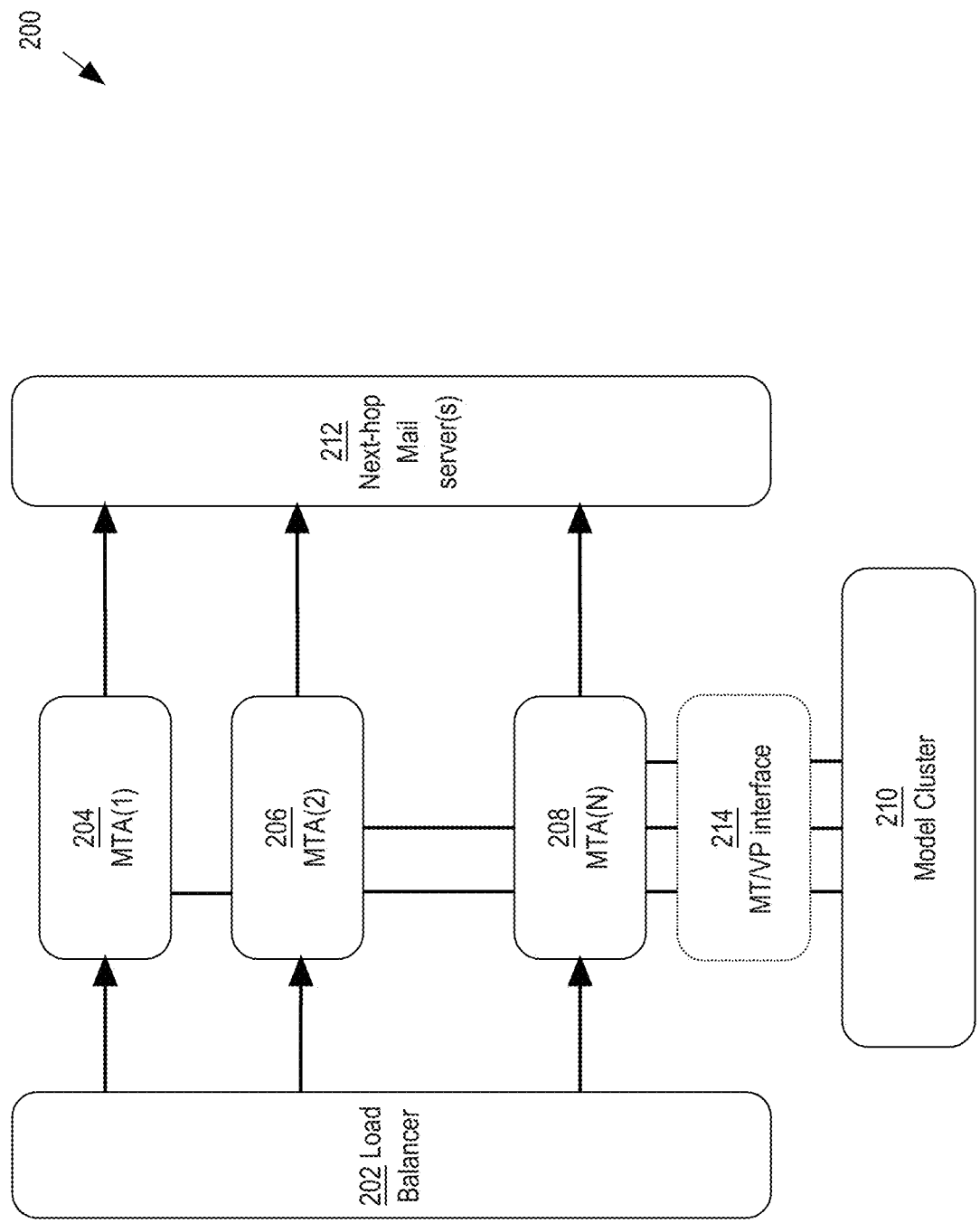
FIG. 2 is a schematic depiction of a portion of the computing system of FIG. 1, in an embodiment.

FIG. 2 illustrates an embodiment of a system architecture in which aspects of the disclosed technologies may be implemented. A network 200 includes network devices 202, 212. Network device 202 is illustratively a load balancer while network device 212 is a next-hop server such as a mail server.

Any number N of message transfer applications (also called agents) (MTAs) 204, 206, 208 are interposed between network devices 202, 212. Thus, electronic messages that are in transit from network device 202 to network device 212 are processed by one or more of MTAs 204, 206, 208 prior to delivery to network device 212. A message scanning application operated by an MTA 204, 206, 208 performs stateless security scanning of messages received from network device 202 and prior to transmission of the messages to network device 212. In an embodiment, the stateless security scanning is performed using a pattern matching-based rules engine built using, for example, YARA. The term application as used herein refers to software, or a combination of software and hardware, which is programmed to perform particular operations including the operations described.

An MT/VP interface 214 is interposed between the MTAs 204, 206, 208 and a model cluster 214. However, portions of MT/VP interface 214 may be implemented within an MTA 204, 206, 208. For instance, portions of data extraction logic 162 and/or risk analysis logic 164 may be implemented in the stateless scanning application of an MTA.

Model cluster 214 is an implementation of vision processing computer(s) 110 and may include one or more machine vision-based model(s) 112 that may be selectively engaged and disengaged by MT/VP interface 214 for use in connection with the stateless scanning performed by the MTAs 204, 206, 208. In an embodiment, model cluster 214 includes models for other kinds of message scanning to detect security risks; for example, logistic regression-based model(s), natural language processing (NLP)-based model(s) and/or heuristic rules-based model(s). In an embodiment, the vision processing computer(s) 110 in model cluster 214 are stateless model servers.

Example of Machine Vision-Based Processing of in-Transit Messages

Figure 3:
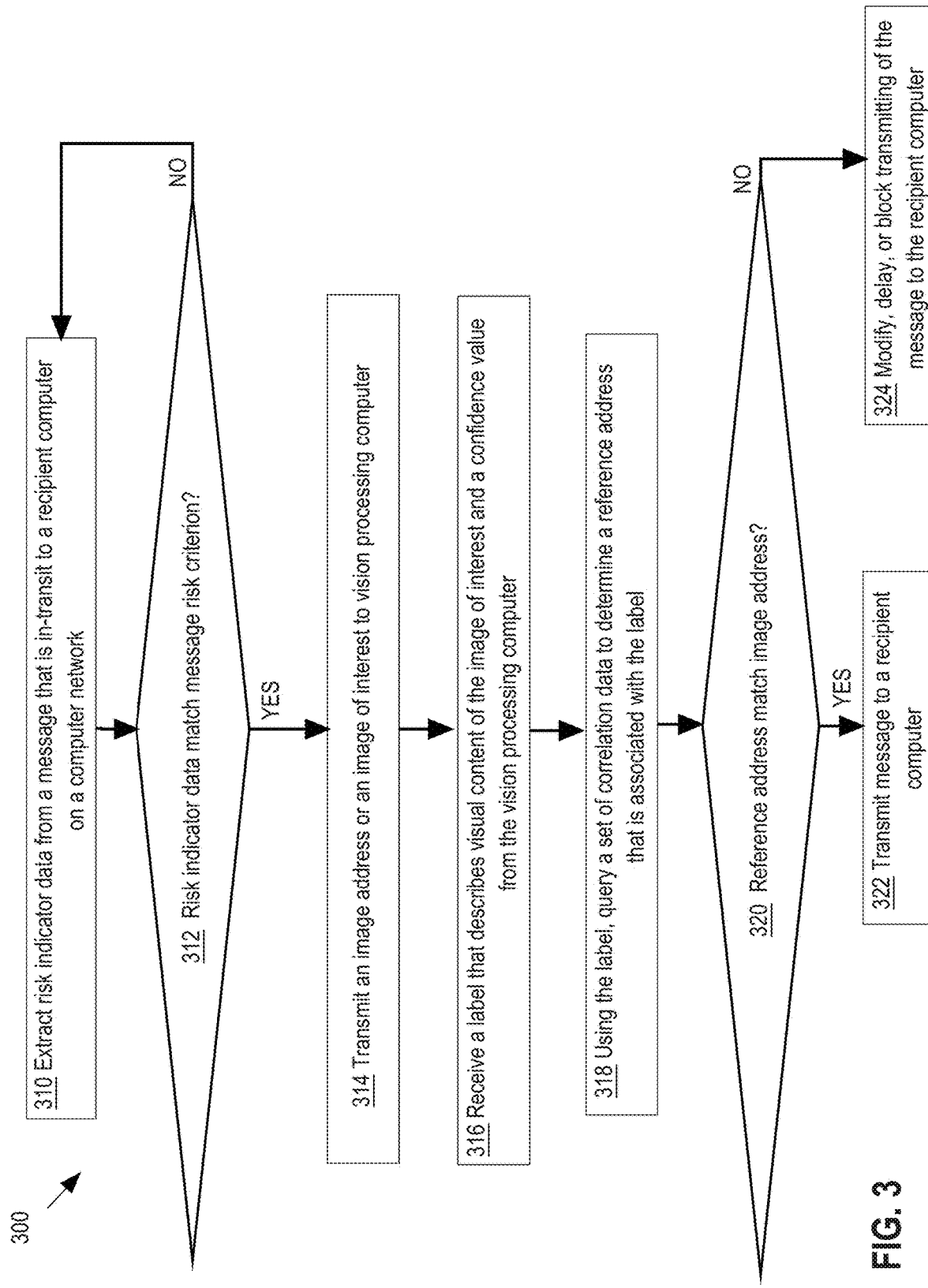
FIG. 3 is a flow diagram that depicts a process that may be executed by a messaging system to interface with a vision processing computer, in an embodiment.

In an embodiment, the above-described technologies are used to automatically and proactively scan electronic messages prior to delivery of the messages to a recipient computer. To that end, FIG. 3 illustrates a process that can be performed by computing system 100. FIG. 3 is a flow diagram that depicts a process 300 for selectively incorporating vision processing technologies into a message scanning process, in an embodiment. Process 300 may be performed by a single entity or program or by multiple entities or programs, including, for example, a client-side mail or messaging application and a server. The operations of the process as shown in FIG. 3 can be implemented using processor-executable instructions that are stored in computer memory. For purposes of providing a clear example, the operations of FIG. 3 are described as performed by various computing device(s) 110, 140, 142, 150, which may be individually or collectively referred to as simply 'computing system 100.'

In operation 310, computing system 100 extracts risk indicator data from a message that is in transit to a recipient computer on a computer network. To do this, computing system 100 extracts text-based data from the message header or from the message body and reads the extracted data into memory. If the message includes an image address, the image address is also extracted in operation 310 and may be included as part of the risk indicator data.

In operation 312, computing system 100 compares the risk indicator data obtained in operation 310 to a message risk criterion. In doing so, computing system 100 may determine whether the risk indicator data includes an image address and if the message does not include an image address, return to operation 310 or end the process 300. To evaluate particular risk indicator data, computing system 100 retrieves corresponding message risk criterion data from memory. The message risk criterion data includes a data value or a set of data values against which the risk indicator data can be compared.

Using for example Boolean logic or set logic, or artificial intelligence-based automated inferencing, operation 312 performs a logical comparison of the risk indicator data to the message risk criterion data. If computing system 100 determines that the risk indicator data matches the message risk criterion, computing system 100 proceeds to operation 314. If computing system 100 determines that the risk indicator data does not match the message risk criterion, computing system 100 may return to operation 310 to extract additional risk indicator data or may end the process 300 or skip to operation 322 without invoking image processing computer(s).

In operation 314, computing system 100 transmits an image address for an image of interest that is coupled to the message, or the image of interest itself, to a vision processing computer. That is, computing system 100 makes a call to the vision processing computer that includes an argument that identifies the image address or the particular image upon which the vision processing computer is to perform visual content analysis. Computing system 100 can identify an image of interest, to send to a vision processing computer, from among multiple images that may be associated with the message based on, for example, the image file name, its domain address, or the image size.

Alternatively, computer system 100 can render the body of the electronic message in, for example, a headless browser, and perform image segmentation to find and identify the particular image of interest within the body of the message. Image segmentation and identification can be performed in two steps: first, a segmentation algorithm divides the rendered message into discrete segments and second, a recognition algorithm examines the image segments for a particular pattern of pixels that may correspond to a particular type of image.

The vision processing computer(s) use the machine vision-based techniques described herein to perform automated recognition of visual content of the image of interest. For instance, using a model that has been trained to recognize a set of corporate logos, the vision processing computer(s) analyze the image of interest to determine whether the image of interest contains any of the logos that the model is trained to recognize. Examples of machine vision-based techniques include classical machine vision-based techniques that use a scale-invariant feature detection-based algorithm or a rotation-invariant feature detection-based algorithm, and neural network-based techniques, such as transfer learning using deep neural networks and convolutional neural networks.

Operation 314 may include starting a timer to count a time interval during which a vision processing computer is expected to return a label. If the timer expires prior to the vision processing computer returning a label, computing system 100 may proceed directly to operation 322 and transmit the message to the recipient computer without performing operations 316, 318, or 320.

If the vision processing computer(s) recognize visual content of the image, the vision processing computer(s) return a label that semantically describes the visual content of the image of interest along with a confidence value. Thus, in operation 316, computing system 100 receives, through an interface with the vision processing computer(s), a label that semantically describes visual content of the image of interest and a confidence value.

The confidence value indicates a mathematical, for example probabilistic, certainty with which the vision processing computer(s) have determined that the label reflects visual content of the image. If the vision processing computer(s) are unable to recognize the visual content of the image of interest with a high enough confidence value, the vision processing computer(s) may return error data. If the confidence value is high enough, computing system 100 proceeds to operation 318. If the confidence value is not high enough, computing system 100 may end the process 300 or proceed to operation 322 without performing operation 318 or operation 320.

To determine whether the confidence value generated by the vision processing computer(s) is high enough, the confidence value is compared to a threshold data value, either by vision processing computer(s) or by another portion of computing system 100. The threshold data value may be established by the particular vision processing computer based on experimentation using training data. Alternatively, the threshold data value may be variable as needed to support a particular application of the system. For instance, in an anti-phishing application, the confidence threshold value may be set high because phishing attacks typically use the highest fidelity imagery that they can obtain, so as to make the message appear legitimate.

In operation 318, if the confidence value is high enough, computing system 100 uses the label returned by the vision processing computer(s) to query a set of correlation data to determine a reference address that is associated with the label. The correlation data maps semantic labels with reference addresses. The correlation data may be stored in a lookup table or in a searchable database, for example. A reference address as used herein may refer to a domain address. For instance, if operation 316 receives a label that is the name of a company, operation 318 maps the company name to a domain address that is known to be a legitimate address for the named company using the correlation.

In operation 320, computing system 100 compares the reference address determined in operation 318 with the image address extracted from the message in operation 310. If the reference address matches the image address, computing system 100 infers that the message is legitimate and, in operation 322, proceeds with transmitting the message to the recipient computer. If the image address does not match the reference address, computing system 100 infers that the message does or may present a security risk or another type of potential problem, and, in operation 324, proceeds with modifying, delaying or blocking the transmitting of the message to the recipient computer.

In an embodiment of operation 320, computing system may use a combination of information including the label returned by vision processing computer(s) and other data extracted from the message to determine the risk level associated with the message. For example, operation 320 may invoke heuristic rules-based model(s) to perform a natural language processing (NLP)-based analysis on text included in the body of the message to look for additional signals that the message may present a security risk or another type of problem.

Example Using Classical Machine Vision-Based Approach

In an embodiment, vision processing computer(s) 110 utilize a classical machine vision-based approach to perform visual content analysis on images that are associated with messages that are processed by message processing computer(s) 150.

FIG. 4A illustrates a process that can be performed by computing system 100. FIG. 4A is a flow diagram that depicts a process 400A for determining a label that semantically describes visual content of a digital image, in an embodiment. Process 400A may be performed by a single entity or program or by multiple entities or programs, including for example use of an API to access a remote vision processing service. The operations of the process as shown in FIG. 4A can be implemented using processor-executable instructions that are stored in computer memory. For purposes of providing a clear example, the operations of FIG. 4A are described as performed by computing device(s) 110, which may be individually or collectively referred to as simply 'computing system 100.'

In operation 410, computing system 100 extracts a feature set from an image of interest. The image of interest may be an image that is contained in, attached to, or referenced by a link in an electronic message. A feature set as used herein may refer to a set of pixel-related measurements that are representative of the visual content of a portion of the image. The feature set may include feature descriptors, which are mathematical descriptions of the raw, numerical measurement data that describe, mathematically, what the feature looks like. The feature set and/or feature descriptors are stored in a feature vector.

Operation 410 executes one or more feature detection and description algorithms, such as multiscale, scale-invariant, or rotation-invariant feature detection algorithms, as mentioned above, to produce the feature vector for the image of interest. In doing so, operation 410 looks for keypoints that represent so-called interesting parts of the image such as significant changes in pixel intensity in more than one direction and may ignore other parts of the image in which there are no significant changes in pixel intensity. As such, the feature vector may contain data the represents changes in pixel intensity as well as the direction of pixel intensity changes.

In operation 412, computing system 100 determines a feature set for a reference image of a set of reference images. The set of reference images may be a set of training images. To determine the reference image and corresponding feature set, operation 412 may access a machine vision-based model such as one or more of model(s) 112 and perform a logarithmic search on the model using a nearest neighbor algorithm.

In operation 414, computing system 100 compares the feature set of the reference image to the feature set for the image of interest, which was determined by operation 410. To do this, operation 414 may compute a Euclidean distance between various dimensions of the feature vector for the image of interest and various dimensions of the feature vector for the reference image.

In operation 416, computing system 100 determines whether there is a homography between the image of interest and the reference image. To do this, operation 416 evaluates the Euclidean distances computed in operation 414 to see if the distances are small enough to indicate that the features match. The threshold distance values used to determine whether a homography exists can be determined based on experimentation and are variable according to the requirements of a particular implementation of the system.

If operation 416 concludes that a homography does not exist between the image of interest and the reference image, computing system 100 may return to operation 412 and repeat operations 412, 414, 416 for another reference image in the set of reference images. If operation 416 concludes that a homography does exist between the image of interest and the reference image, computing system 100 proceeds to operation 418.

In operation 418, computing system 100 determines a label to associate with the image of interest. To do this, operation 418 obtains, from the machine vision-based model, the label that is associated with the reference image that has a homography with the image of interest. The associations of labels with reference images may be pre-established, and can include multiple levels of abstraction, such as through the use of an ontology.

In operation 420, computing system 100 determines a confidence value to associate with the label determination. To do this, operation 420 may assign a high confidence value, for example, a value of one, if operation 416 found a homography between the reference image and the image of interest, or assign a low confidence value, for example, a value of zero, if operation 416 found no homography between the reference image and the image of interest. The confidence value determined in operation 420 may correspond to the degree of similarity between the reference image and the image of interest.

Example Using Neural Network-Based Approach

In an embodiment, vision processing computer(s) 110 utilize a neural network-based approach to perform visual content analysis on images that are associated with messages that are processed by message processing computer(s) 150. Examples of neural network-based approaches that have been tested have utilized deep neural networks (DNNs), including convolutional deep neural networks, and transfer learning approaches in which an existing DNN that has been trained for one classification task is adapted to a different classification task by replacing the final layer(s) of the network with task-specific algorithms and/or weighting schemes.

FIG. 4B illustrates a process that can be performed by computing system 100. FIG. 4A is a flow diagram that depicts a process 400B for determining a label to associate with an image of interest, in an embodiment. Process 400B may be performed by a single entity or program or by multiple entities or programs, including for example using an API to access a remote vision processing service. The operations of the process as shown in FIG. 4B can be implemented using processor-executable instructions that are stored in computer memory. For purposes of providing a clear example, the operations of FIG. 4B are described as performed by computing device(s) 110, which may be individually or collectively referred to as simply 'computing system 100.'

In operation 440, computing system 100 extracts a feature set from an image of interest. The image of interest may be an image that is contained in, attached to, or referenced by a link in an electronic message. A feature set as used herein may refer to a set of pixel-related measurements that are representative of the visual content of a portion of the image. The feature set may include feature descriptors, which are mathematical descriptions of the raw, numerical measurement data that describe, mathematically, what the feature looks like. The feature set and/or feature descriptors are stored in a feature vector.

Operation 440 executes one or more feature detection and description algorithms, such as multiscale, scale-invariant, or rotation-invariant feature detection algorithms, as mentioned above, to produce the feature vector for the image of interest. In doing so, operation 440 looks for keypoints that represent so-called interesting parts of the image such as significant changes in pixel intensity in more than one direction and may ignore other parts of the image in which there are no significant changes in pixel intensity. As such, the feature vector may contain data the represents changes in pixel intensity as well as the direction of pixel intensity changes.

In operations 442 and 444, computing system 100 performs feature detection and classification, optionally iteratively using different combinations of features from the feature set obtained in operation 440. In operation 442, computing system 100 determines a feature subset, which is a subset of the feature set determined in operation 440. Computing system 100 applies a set of weights to the feature subset using matrix multiplication. The weighted values are determined through experimentation and reflect the relative importance of a particular feature to a particular classification.

In operation 444, a machine learning-based algorithm is executed using the weighted features as determined in operation 442 to determine a classification for the weighted subset of features. An example of a machine learning-based algorithm that can be used in operation 444 is a classical logistic regression algorithm, but there are many other types of algorithms that can be used. Computing system 100 optionally returns to operation 442 and repeats operations 442, 444 any number of times using, successively, the output of the previous layer of the neural network as inputs to the subsequent layer of the neural network and with potentially different weight values applied to the feature subsets. In this way, classifications at successively higher levels of abstraction or precision can be obtained.

In operation 446, computing system 100 compares the output of the computations performed in operation 444 to a threshold confidence value to determine whether the process arrived at a high confidence classification. The threshold value used in operation 446 may be determined based on experimentation or set according to the requirements of a particular implementation of the system.

If the output of operation 444 does not satisfy the threshold value, computing system 100 ends the process in operation 452. If the output of operation 444 satisfies the threshold value, computing system 100 proceeds to operation 448. In operation 448, computing system 100 determines a label to associate with the image of interest based on the classification that has been obtained as a result of the preceding operations 440, 442, 444, 446.

To do this, operation 448 obtains, from a machine vision-based model, the label that is associated with the classification determined in operation 444. The associations of semantically descriptive labels with classifications can be incorporated into a machine vision-based model that is used by the process 400B, and can include multiple levels of abstraction, such as through the use of an ontology.

In operation 450, computing system 100 determines a confidence value to associate with the label determination made in operation 448. To do this, operation 450 may assign a high confidence value, for example, a value of one, if operation 446 determined that the output of operation 444 satisfied the applicable threshold value, or may assign a low confidence value, for example, a value of zero, if operation 446 determined that the output of operation 444 did not satisfy the applicable threshold value. The confidence value determined in operation 450 may correspond to the degree of similarity between the output of operation 444 and the threshold value against which it is compared in operation 446.

Use Case: Identifying a Suspicious Message

In one use case, the above-described technologies are used to pre-emptively detect and thereby prevent message-based phishing attacks. A message processing application, such as a message transfer agent, employs stateless security scanning to scan messages as they are in transit from a sending computer to one or more recipient computers. The message scanner detects a message (such as an email or a web page) that contains one or more image tags referencing locations on the network of images of interest.

The message processing application determines the source arguments referenced by the image tags and either passes the arguments to the vision processing system or downloads the images of interest and sends the images themselves to the vision processing system. The vision processing system employs machine vision-based technologies as described above to perform logo detection on the images of interest. If a vision processing algorithm detects that an image of interest contains a logo, the message processing system determines a semantically descriptive label associated with the logo, such as the name of the company that owns the logo.

The message processing system then uses the label, for example the company name, to determine the legitimate domain address associated with the company and thus with the logo. The message processing system then compares the legitimate domain address to the address contained in the source arguments for the image of interest. If the two addresses do not match, the message processing system infers that the message is not legitimate.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

ADDITIONAL EXAMPLES

Illustrative examples of the technologies disclosed herein are provided below. An embodiment of the technologies may include any of the examples described below.

In an example 1, a computer system includes: one or more computer processors configured with a message transfer application; a message transfer/vision processing (MT/VP) interface coupled to the one or more computer processors and interposed between the message transfer application and a vision processing computer, wherein the MT/VP interface performs operations including: extracting risk indicator data from a message that is in transit to a recipient computer on a computer network; in response to the risk indicator data matching a message risk criterion, transmitting an image address for an image of interest coupled to the message or the image of interest to the vision processing computer; receiving, from the vision processing computer, a label that semantically describes visual content of the image of interest; using the label, querying a set of correlation data to determine a reference address that is associated with the label; in response to the image address matching the reference address, transmitting the message to the recipient computer; in response to the image address not matching the reference address, modifying, delaying or blocking the transmitting of the message to the recipient computer.

An example 2 includes the computer system of example 1, wherein the risk indicator data includes quantitative data, the message risk criterion includes a threshold value, and the MT/VP interface performs operations including comparing the quantitative data to the threshold value. An example 3 includes the computer system of example 2, wherein the message transfer application and the MT/VP interface performs operations including determining the quantitative data by counting image links in the message. An example 4 includes the computer system of example 1, wherein the risk indicator data includes qualitative data, the message risk criterion includes category data and the MT/VP interface performs operations including determining whether the qualitative data matches the category data. An example 5 includes the computer system of example 4, wherein the MT/VP interface performs operations including determining the qualitative data by reading header data of the message. An example 6 includes the computer system of any of the preceding examples, wherein the MT/VP interface performs operations including, based on the risk indicator data, transmitting the message to the recipient computer without performing the transmitting the image address or the image of interest to the vision processing computer and without performing the receiving the label and without performing the querying the set of correlation data.

An example 7 includes the computer system of example 1, wherein the MT/VP interface performs operations including, in response to the transmitting the image address or the image of interest to the vision processing computer, starting a timer; in response to expiration of the timer prior to the receiving from the vision processing computer the label, transmitting the message to the recipient computer without performing the receiving from the vision processing computer the label and without performing the querying the set of correlation data.

An example 8 includes the computer system of example 1, where the MT/VP interface performs operations that include determining a confidence value associated with the label; in response to the confidence value not satisfying a confidence threshold, transmitting the message to the recipient computer; in response to the confidence value satisfying the confidence threshold, modifying, delaying, or blocking the transmitting of the message to the recipient computer. An example 9 includes the computer system of example 8, wherein the MT/VP interface performs operations including extracting one or more text-based features from the message; executing a heuristic rules-based algorithm that correlates the label with the one or more text-based features extracted from the message to determine the confidence value associated with the label. An example 10 includes the computer system of example 1, wherein the MT/VP interface performs operations including causing the vision processing computer to determine the label by executing a machine learning-based algorithm concurrently with the message transfer application. An example 11 includes the computer system of example 10, wherein the machine learning-based algorithm includes a scale-invariant feature detection-based algorithm or a rotation-invariant feature detection-based algorithm or a neural network-based algorithm. An example 12 includes the computer system of example 10, wherein the MT/VP interface performs operations including causing the vision processing computer to determine the label by executing a classification algorithm using output of the machine learning-based algorithm and a model that includes a data structure that stores correlation data for labels and visual content.

In an example 13, a method includes, by one or more computer processors configured with a message transfer application and a message transfer/vision processing (MT/VP) interface interposed between the message transfer application and a vision processing computer: extracting risk indicator data from a message that is in transit to a recipient computer on a computer network; in response to the risk indicator data matching a message risk criterion, transmitting an image address for an image of interest coupled to the message or the image of interest to the vision processing computer; receiving, from the vision processing computer, a label that semantically describes visual content of the image of interest; using the label, querying a set of correlation data to determine a reference address that is associated with the label; in response to the image address matching the reference address, transmitting the message to the recipient computer; in response to the image address not matching the reference address, modifying, delaying or blocking the transmitting of the message to the recipient computer.

An example 14 includes the method of example 13, wherein the risk indicator data includes quantitative data, the message risk criterion includes a threshold value, and the method includes comparing the quantitative data to the threshold value. An example 15 includes the method of example 14, including determining the quantitative data by counting image links in the message. An example 16 includes the method of example 13, wherein the risk indicator data includes qualitative data, the message risk criterion includes category data and the method includes determining whether the qualitative data matches the category data. An example 17 includes the method of example 16, including determining the qualitative data by reading header data of the message. An example 18 includes the method of example 13, including, based on the risk indicator data, transmitting the message to the recipient computer without performing the transmitting the image address or the image of interest to the vision processing computer and without performing the receiving the label and without performing the querying the set of correlation data. An example 19 includes the method of example 13, including, in response to the transmitting the image address or the image of interest to the vision processing computer, starting a timer; in response to expiration of the timer prior to the receiving from the vision processing computer the label, transmitting the message to the recipient computer without performing the receiving from the vision processing computer the label and without performing the querying the set of correlation data.

An example 20 includes the method of example 13, including determining a confidence value associated with the label; in response to the confidence value not satisfying a confidence threshold, transmitting the message to the recipient computer; in response to the confidence value satisfying the confidence threshold, modifying, delaying, or blocking the transmitting of the message to the recipient computer. An example 21 includes the method of example 20, including extracting one or more text-based features from the message; executing a heuristic rules-based algorithm that correlates the label with the one or more text-based features extracted from the message to determine the confidence value associated with the label. An example 22 includes the method of example 13, including causing the vision processing computer to determine the label by executing a machine learning-based algorithm concurrently with the message transfer application. An example 23 includes the method of example 22, wherein the machine learning-based algorithm includes a scale-invariant feature detection-based algorithm or a rotation-invariant feature detection-based algorithm or a neural network-based algorithm. An example 24 includes the method of example 22, including causing the vision processing computer to determine the label by executing a classification algorithm using output of the machine learning-based algorithm and a model that includes a data structure that stores correlation data for labels and visual content.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer system comprising:
   one or more computer processors configured with a message transfer application;
   a message transfer/vision processing (MT/VP) interface coupled to the one or more computer processors and interposed between the message transfer application and a vision processing computer, wherein the MT/VP interface performs operations comprising:
   extracting risk indicator data from a message that is in transit to a recipient computer on a computer network;
   in response to the risk indicator data matching a message risk criterion, transmitting an image address for an image of interest coupled to the message or the image of interest to the vision processing computer;
   receiving, from the vision processing computer, a label that semantically describes visual content of the image of interest;
   using the label, querying a set of correlation data to determine a reference address that is associated with the label;
   in response to the image address matching the reference address, transmitting the message to the recipient computer;
   in response to the image address not matching the reference address, modifying, delaying or blocking the transmitting of the message to the recipient computer;
   determining a confidence value associated with the label;
   in response to the confidence value not satisfying a confidence threshold, transmitting the message to the recipient computer;
   in response to the confidence value satisfying the confidence threshold, modifying, delaying, or blocking the transmitting of the message to the recipient computer.

2. The computer system of claim 1, wherein the risk indicator data comprises quantitative data, the message risk criterion comprises a threshold value, and the MT/VP interface performs operations comprising comparing the quantitative data to the threshold value.

3. The computer system of claim 2, wherein the message transfer application and the MT/VP interface performs operations comprising determining the quantitative data by counting image links in the message.

4. The computer system of claim 1, wherein the risk indicator data comprises qualitative data, the message risk criterion comprises category data and the MT/VP interface performs operations comprising determining whether the qualitative data matches the category data.

5. The computer system of claim 4, wherein the MT/VP interface performs operations comprising determining the qualitative data by reading header data of the message.

6. The computer system of claim 1, wherein the MT/VP interface performs operations comprising, based on the risk indicator data, transmitting the message to the recipient computer without performing the transmitting the image address or the image of interest to the vision processing computer and without performing the receiving the label and without performing the querying the set of correlation data.

7. The computer system of claim 1, wherein the MT/VP interface performs operations comprising, in response to the transmitting the image address or the image of interest to the vision processing computer, starting a timer;
   in response to expiration of the timer prior to the receiving from the vision processing computer the label, transmitting the message to the recipient computer without performing the receiving from the vision processing computer the label and without performing the querying the set of correlation data.

8. The computer system of claim 1, wherein the MT/VP interface performs operations comprising
   extracting one or more text-based features from the message;
   executing a heuristic rules-based algorithm that correlates the label with the one or more text-based features extracted from the message to determine the confidence value associated with the label.

9. The computer system of claim 1, wherein the MT/VP interface performs operations comprising causing the vision processing computer to determine the label by executing a machine learning-based algorithm concurrently with the message transfer application.

10. The computer system of claim 9, wherein the machine learning-based algorithm comprises a scale-invariant feature detection-based algorithm or a rotation-invariant feature detection-based algorithm or a neural network-based algorithm.

11. The computer system of claim 9, wherein the MT/VP interface performs operations comprising causing the vision processing computer to determine the label by executing a classification algorithm using output of the machine learning-based algorithm and a model that comprises a data structure that stores correlation data for labels and visual content.

12. A method comprising, by one or more computer processors configured with a message transfer application and a message transfer/vision processing (MT/VP) interface interposed between the message transfer application and a vision processing computer:
   extracting risk indicator data from a message that is in transit to a recipient computer on a computer network;
   in response to the risk indicator data matching a message risk criterion, transmitting an image address for an image of interest coupled to the message or the image of interest to the vision processing computer;
   receiving, from the vision processing computer, a label that semantically describes visual content of the image of interest;
   using the label, querying a set of correlation data to determine a reference address that is associated with the label;
   in response to the image address matching the reference address, transmitting the message to the recipient computer;
   in response to the image address not matching the reference address, modifying, delaying or blocking the transmitting of the message to the recipient computer;
   determining a confidence value associated with the label;
   in response to the confidence value not satisfying a confidence threshold, transmitting the message to the recipient computer;
   in response to the confidence value satisfying the confidence threshold, modifying, delaying, or blocking the transmitting of the message to the recipient computer.

13. The method of claim 12, wherein the risk indicator data comprises quantitative data, the message risk criterion comprises a threshold value, and the method comprises comparing the quantitative data to the threshold value.

14. The method of claim 13, comprising determining the quantitative data by counting image links in the message.

15. The method of claim 12, wherein the risk indicator data comprises qualitative data, the message risk criterion comprises category data and the method comprises determining whether the qualitative data matches the category data.

16. The method of claim 15, comprising determining the qualitative data by reading header data of the message.

17. The method of claim 12, comprising, based on the risk indicator data, transmitting the message to the recipient computer without performing the transmitting the image address or the image of interest to the vision processing computer and without performing the receiving the label and without performing the querying the set of correlation data.

18. The method of claim 12, comprising, in response to the transmitting the image address or the image of interest to the vision processing computer, starting a timer;

in response to expiration of the timer prior to the receiving from the vision processing computer the label, transmitting the message to the recipient computer without performing the receiving from the vision processing computer the label and without performing the querying the set of correlation data.

\* \* \* \* \*